United States Patent [19]

Flasche et al.

[11] Patent Number: 4,916,281
[45] Date of Patent: Apr. 10, 1990

[54] GAS BACK-PURGING DURING WELDING OF PIPE

[75] Inventors: Lee M. Flasche, Kokomo; Gregory L. Hoback, Greentown; James L. Meyers, Kokomo, all of Ind.

[73] Assignee: Haynes International, Inc., Kokomo, Ind.

[21] Appl. No.: 313,824

[22] Filed: Feb. 23, 1989

[51] Int. Cl.⁴ .............................................. B23K 9/16
[52] U.S. Cl. ........................................ 219/61; 219/74
[58] Field of Search ................ 219/60 R, 61, 136, 74, 219/137 R; 138/90

[56] References Cited

U.S. PATENT DOCUMENTS 2,747,065  5/1956  Diehl ..................................... 219/61
2,802,092  8/1957  Hauck ............................... 219/60 R
3,292,254  12/1966  Sloan ..................................... 138/90

OTHER PUBLICATIONS

"Recommended Practices for Root Pass Welding of Pipe Without Backing", American Welding Society.
Holby, "Power-Plant Pipe Must be Leak Free", *Welding Design & Fabrication*, 3/1986.
Aastrup et al, "Welding in Stainless Steels with Underside Gas Shielding" *Svejsning*, vol. 11, Part 1, pp. 13–15, 2/1984.

*Primary Examiner*—Clifford C. Shaw
*Attorney, Agent, or Firm*—Joseph J. Phillips

[57] ABSTRACT

Disclosed is an improvement in the process of gas back-purging the root section of the weld during open-butt welding of pipe. The rates of gas flow in back-purging and in torch shielding are controlled and a ratio between the flow rates is established. The invention teaches a gas back-purging flow rate of about 40 CFH and a torch shielding flow rate of about 10 CFH under typical conditions to maintain a required 4 to 1 ratio of the flow rates.

3 Claims, 1 Drawing Sheet

GAS BACK-PURGING DURING WELDING OF PIPE

This invention relates to the welding of metal pipes and, more specifically, to the technique of gas back-purging in welding high alloyed nickel base sections of pipe, tubing and the like.

BACKGROUND AND PRIOR ART

In the installation of piping systems, it is often necessary to butt weld together long lengths of pipe. This limits access to the internal "root" side of the weld joint. As used herein, the term "pipe" also includes tubular metal parts where there is limited access to the internal root side.

Highly alloyed pipe, for example, nickel-base superalloys and corrosion resistant alloys, is especially subject to welding defects at the "root" side of the weld even when gas back-purging is used. Typical pipe may also include highly alloyed iron-base alloys and cobalt-base alloys.

Efforts to solve the problem are found in the prior art. For example, U.S. Pat. No. 3,736,400 (Spiegel, et al) discloses the use of water soluble paper to construct a protective dam. U.S. Pat. No. 3,292,254 (Sloan) discloses a bag-like collapsible container as a means to control the atmosphere. American Welding Society 1987 publication ANSI/AWS D10.11-87 entitled "Recommended Practices for Root Pass Welding of Pipe Without Backing" also discusses the problem in a very comprehensive state-of-the-art manner. In the March 1986 issue of Welding Design & Fabrication, page 59, an article entitled "Power-Plant Pipe Must be Leak Free" also describes the process.

An article by P. Aastrup and P. Arp entitled *Welding in Stainless Steels with Underside Gas Shielding* was published in SVEJSNING Vol. II, Part 1, February 1984 (in Swedish). The article describes several degrees of oxidation of the weldment during welding and discloses methods to control (reduce) oxidation rates by gas back-purging.

In every case, the prior art mentioned herein, and all other references known to date, consistently teach that a very low flow rate of gas back-purging should be maintained in the root section during welding. One reference suggested "barely detectable at the gas exit port." For example, 8 to 12 cubic feet per hour (CFH) is suggested in the ASM Handbook Vol. 6, 9th Edition, page 200.

In this welding process, open-butt welding, using the gas tungsten arc welding (GTAW) process, is normally employed in making root-pass welds. When these one-sided welding techniques are used, it is necessary to protect the root side of the weld joint from oxidation during welding with an inert shielding gas (usually welding grade argon). The shielding technique, which protects the inside of the pipe, is called back-purging.

Lack of proper shielding produces a condition often referred to as "sugar" of the root pass. Such a condition is characterized by a black, crusty appearance of the weld metal on the inside (root) of the pipe. When this occurs, the molten weld metal will not flow out and "wet" the base material edges. This condition makes welding difficult and the passing of a radiographic examination nearly impossible. Common welding defects, which form as a result of this condition, include lack of fusion, root-pass cracking and root-pass suck-back.

It has been reported that, when using this one-sided technique, nickel-base alloys, such as produced under the trademark HASTELLOY, are more difficult to weld than stainless or carbon steels.

Two common methods are used to back-purge a pipe root-pass weld zone. Purging the entire volume of a long pipe run is often suggested. Tables have been published concerning purge times for various pipe diameters and lengths of pipe run. Local purging of the immediate volume around the weld zone is an alternative method of back-purging and is generally considered the preferred method. Various methods of forming the closure dams are reported in the literature. They include soluble dams, inflatable bladder dams, collapsible disk dams and thermally disposable dams.

Back-purging is accomplished in two steps. First, the dams must be installed and the weld-zone volume purged to acceptable levels. Second, purging must continue and accompany the actual welding operation.

Even with the best practice of the present state-of-the-art process, the results are erratic and often major failures occur. The cause of the erratic results has not been determined.

OBJECTS OF THE INVENTION

It is a principal object of this invention to provide a gas back-purging/welding process that results in more consistent acceptable welds.

It is another object of this invention to provide a gas back-purging process that may be used in a wider range of welding conditions and compositions of pipe.

These and other objects and advantages may be discerned by persons skilled in the art.

BRIEF DESCRIPTION OF THE DRAWINGS

In FIG. 1, the prior art process, A is the GTAW welding torch. B represents the flow of atmosphere (air) through the system. C represents the welding torch shielding gas. D represents the minimal positive gas pressure identified as back purge in the prior art.

In FIG. 2, the process of this invention, A is the GTAW welding torch. B represents the repulsion of atmosphere (air) away from the system. C represents the welding torch shielding gas. D represents the "high flow" back-purge gas.

Figure 1:
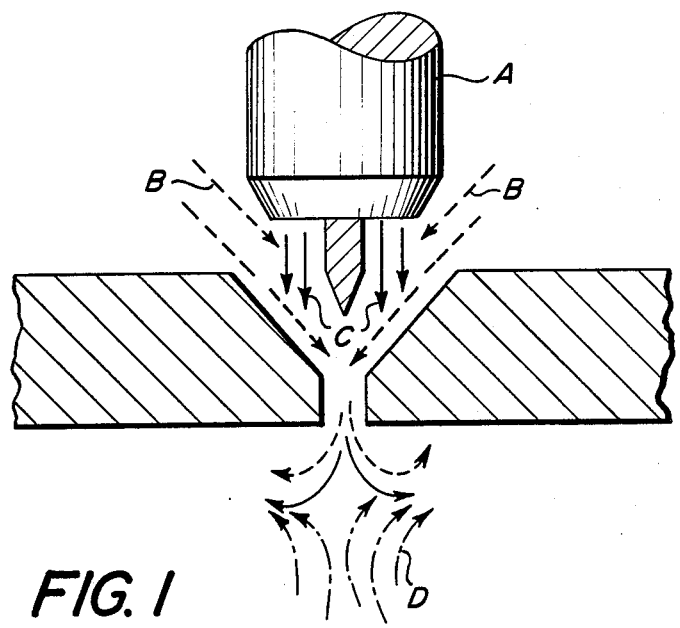
FIG. 1 is a drawing of the gas flow in the prior art.

The prior art, as shown in FIG. 1, is replete with disclosures indicating a teaching of low to "barely detectable" flow rate of the back-purging gas. Nearly all prior art references strongly suggest only a "static positive pressure" is necessary.

Figure 2:
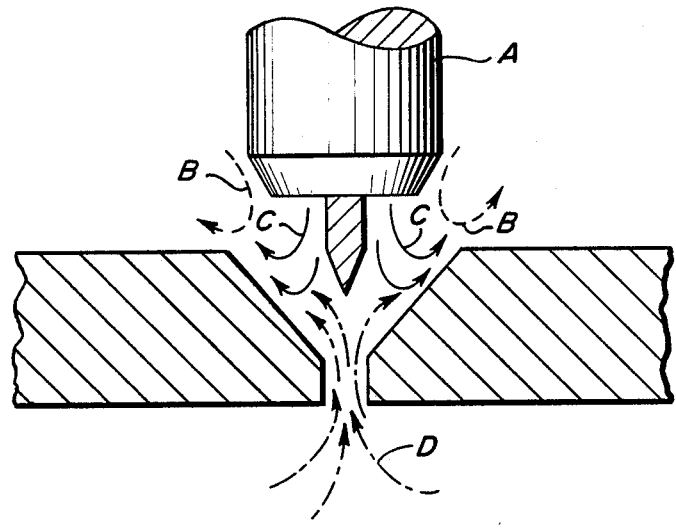
FIG. 2 is a drawing of the gas flow in this invention.

The process of this invention, as shown in FIG. 2, clearly shows the dynamics of flow rates of both shielding gas and back-purging gas as taught by this invention.

EXPERIMENTAL TESTS AND RESULTS

Some experimental tests were made. Only water soluble dams were used. As a way to ensure that the purge gas entered the enclosed weld zone with a minimum of gas flow turbulence, thus allowing the shortest purge time, a diffusing device was manufactured and secured at the bottom of one of the purge dams. The use of diffusion devices is well known in the art. The local weld zone was purged at about 40 cubic feet per hour (CFH) of gas flow rate. Such flow rates allowed purging of an 8" diameter pipe section to about 5000-ppm oxygen content in less than 5 minutes. Regardless of the length of time of purging after the initial 5 minutes, it was not possible to obtain oxygen contents below the 5000-ppm oxygen level consistently. The 5000-ppm oxygen level was determined to be acceptable for the welding of nickel-based alloys.

Rood-pass welds were made using the welding parameters shown in Table 1. In the first test, the back-purge flow rate was 40 CFH and the welding torch flow rate was 10 CFH. Results of this test are shown in Table 2, identified as Test A. Then the flow rates were reversed such that the back-purge gas flow rate was 10 CFH and the welding torch flow rate was 30 CFH. All other welding parameters were as indicated in Table 1. The results of that testing are shown in Table 2 and are identified as Test B.

The selection of the flow rate (10 CFH) for the torch shielding gas is somewhat low based upon standard recommendations for welding HASTELLOY nickel-base alloys. This low welding torch flow rate does not, however, affect the torch side shielding as indicated by bright, shiny beads which were present with either shielding technique.

In this testing program, HASTELLOY alloy C-22 pipe was used. This alloy contains essentially 22% chromium, 13% molybdenum, 3% tungsten, 3% iron and balance nickel. C-22 TM filler material has a similar composition.

In Test B (representing the prior art practice) very poor root side weld results were obtained as determined by visual weld inspection practice. In that test, the root side weld bead was black and crusty with inadequate bead reinforcement. It is believed that such a weld would be rejected when tested using standard radiographic weld inspection techniques.

In Test A (representing the present invention) bright, shiny root welds were noted when inspected using standard visual weld inspection techniques. Based upon the positive weld reinforcement and the smooth blending of the weld metal into the base metal, it is believed that such a weld would provide acceptable results when tested using standard radiographic inspection techniques.

As stated above, all welding parameters were maintained constant as shown in Table 1, except for the gas flow rates reported for Tests A and B. Because acceptable root pass welds were produced first and then poor weld results were obtained after changing the relative flow rates between the backing gas and the welding torch, the test results, as shown in Table 2, clearly show the improvement in the art resulting from the present invention.

TABLE 1

WELDING PARAMETERS
FOR
ROOT-PASS OPEN-BUTT
GAS TUNGSTEN ARC PIPE WELDING
(GTAW)

Joint design: 70 degree included angle
Base material: HASTELLOY ® alloy C-22 pipe
Base material thickness: ¼"
Filler material: C-22 TM filler metal
Filler material diameter: 3/32"
Preheat temperature: Room temperature
Interpass temperature: 200° F. maximum
Shielding gas: 100% welding grade Argon
　　　　　　　Flow rate 10 CFH (Test A)
　　　　　　　Flow rate 30 CFH (Test B)
Backing gas: 100% welding grade Argon
　　　　　　 Flow rate 40 CFH (Test A)

TABLE 1-continued

WELDING PARAMETERS
FOR
ROOT-PASS OPEN-BUTT
GAS TUNGSTEN ARC PIPE WELDING
(GTAW)

Flow rate 10 CFH (Test B)
Electrical characteristics:　DCSP (electrode −)
　　　　　　　　　　　　Amperage: 50–125 amps
　　　　　　　　　　　　Voltage: 11–12 volts
　　　　　　　　　　　　Travel speed: 2–4 inch per minute
Welding technique:　1. Welding torch perpendicular to pipe
　　　　　　　　　 2. Feather all starts and stops (both
　　　　　　　　　　　tack welds and closure welds)
　　　　　　　　　 3. Cleaning by stainless steel brush

TABLE 2

| | TEST RESULTS | |
|---|---|---|
| | Expected Radiographic Examination Results | Visual Appearance Results |
| Test A | | |
| This invention | Pass | Excellent |
| Test B | | |
| Prior art | Fail | Poor |

RECOMMENDATIONS FOR THE COMPLETE PROCEDURE

The purging and welding of a piping joint generally involves six operations. These operations include:
1. Preparation of pipe ends.
2. Installation of purge dams.
3. Fit-up of pipe sections.
4. Purge pipe weld zone.
5. Tack weld pipe sections.
6. Closure welding.

1. Preparation of the pipe ends is considered a very important step in this welding operation. It is recommended that a weld angle of about 35 degrees be machined onto the pipe ends.

Further it is recommended that both the ID and OD be cleaned to bright-shiny metal for a distance of about 1-inch from the weld preparation edge and that a land be machined or ground. After all machining and grinding operations are completed, thorough cleaning and degreasing of the entire area is required.

2. Any of the purging systems discussed above, except thermally disposable dams, are considered acceptable for nickel-base pipe systems. As a way to insure that the purge gas enters the enclosed weld zone with a minimum of gas flow turbulence, a gas diffusing device is recommended. The purge dams must be installed deep enough in the pipe section so that the heat of welding will not cause damage to the dams.

3. Fit-up of the pipe sections requires care so as to establish proper root gap tolerance between the two pipe sections. It is generally recommended that the root gap be at least 1/32-inch larger than the diameter of welding filler wire to be used. This will allow for manipulation of the filler wire even when some shrinkage occurs during tack welding and closure welding.

4. Purging of the weld zone is done at about 40 CFH. The weld joint should be sealed around the circumference of the pipe except for a small opening at the top position of the pipe. The intention is to have the shielding gas enter at the bottom of the weld zone and exit at the top. If pipe welding is being performed in the vertical (2G) position, the gas should enter at the bottom purge dam and exit through a small hole in the top purge dam. Normally, flow rates and times are selected so that a minimum of 5 to 6 shielding gas volume changes take place prior to welding.

5. Tack welding is necessary to ensure that the two pipe sections do not move during subsequent closure welding. The tack welds must be large enough and placed often enough around the joint circumference so that the root gap remains open and wider than the welding filler wire diameter. Generally, the weld joint is kept sealed except in the area where welding is being conducted.

It is recommended that the tack welds be ground to a feather edge. This will help ensure that the closure welds will tie into the tack welds and not leave small defects which might be detected during radiographic examination.

The shielding gas flow rates during tack welding, and during subsequent closure welding, should be about 40 CFH for the back-purge and about 10 CFH for the welding torch. Other welding parameters are given in Table 1.

Torch position and filler wire position are critical to the success of root pass welding. The positions of the GTAW torch body and welding filler wire relative to the pipe must be carefully determined.

Torch and filler wire manipulation consist of torch movement from sidewall to sidewall which forms a "keyhole." Two drops of filler material are melted into each sidewall with each back and forth motion of the welding torch. The filler metal is generally positioned in the root gap opening. If the root gap "closes-up," not allowing the filler wire to be placed in the root gap, the amount of weld reinforcement at the root will be limited.

6. The closure welding is performed much like the tack welding. Again, the joint is kept sealed except in the area where welding is being performed. During the final closure weld, the gas purge flow rate may be lowered so that the dams will not be damaged due to shielding gas pressure increase. It is generally recommended that back-purge gas be maintained for the first two fill pass welds. This will help insure that the root pass is not heavily oxidized during these subsequent weld passes.

What is claimed is:

1. The process of welding pipe wherein a back-purging gas system is used, including the following steps:
   preparing the pipe ends to be welded;
   installing purge dams;
   fitting the pipe sections to establish proper root gap tolerance;
   purging the weld zone at a rate about 40 CFH down to about 5000 ppm oxygen content;
   tack welding and closure welding of the pipe, using torch shielding and back-purging gas flow rates;
   characterized by: a back-purging gas flow rate to welding torch shielding gas flow rate within the ratios of 2 to 1 and 6 to 1.

2. The process of claim 1 wherein the ratio of back-purging flow rate to torch shielding gas flow rate is about 4 to 1.

3. The process of claim 1 wherein the flow rate of back-purging gas is about 40 CFH and the flow rate of torch shielding gas is about 10 CFH.

* * * * *

UNITED STATES PATENT AND TRADEMARK OFFICE
CERTIFICATE OF CORRECTION

PATENT NO.   :   4,916,281

DATED        :   April 10, 1990

INVENTOR(S)  :   Lee H. Flasche, Gregory L. Hoback, James L. Meyers

It is certified that error appears in the above-identified patent and that said Letters Patent is hereby corrected as shown below:

On the title page:

In Inventor(s): in the Patent, delete "M." before Flasche and substitute --H.-- therefor In Column 3, Line 7 of the Patent, delete "Rood" before -pass and substitute --Root-- therefor.

Signed and Sealed this

Second Day of July, 1991

Attest:

HARRY F. MANBECK, JR.

*Attesting Officer*   *Commissioner of Patents and Trademarks*